United States Patent
Zheng et al.

(10) Patent No.: US 8,038,155 B2
(45) Date of Patent: Oct. 18, 2011

(54) MAGNETICALLY-CONTROLLED ROTARY SEAL

(75) Inventors: Xiaoqing Zheng, East Greenwich, RI (US); Gerard M. Berard, North Providence, RI (US)

(73) Assignee: Eaton Corporation, Cleveland, OH (US)

( * ) Notice: Subject to any disclaimer, the term of this patent is extended or adjusted under 35 U.S.C. 154(b) by 908 days.

(21) Appl. No.: 11/775,280

(22) Filed: Jul. 10, 2007

(65) Prior Publication Data

US 2008/0042364 A1 Feb. 21, 2008

Related U.S. Application Data

(60) Provisional application No. 60/819,407, filed on Jul. 10, 2006.

(51) Int. Cl.
*F16J 15/43* (2006.01)
*F16J 15/42* (2006.01)

(52) U.S. Cl. ......... 277/378; 277/302; 277/400; 277/410

(58) Field of Classification Search ............ 277/378, 277/410, 400, 302
See application file for complete search history.

(56) References Cited

U.S. PATENT DOCUMENTS

| | | | |
|---|---|---|---|
| 2,843,403 A | 7/1958 | Stevenson | |
| 3,869,135 A | 3/1975 | Diederich | |
| 4,447,063 A | 5/1984 | Kotzur et al. | |
| 4,480,026 A | 10/1984 | Ashcraft et al. | |
| 5,078,411 A | 1/1992 | Geco | |
| 5,137,286 A | 8/1992 | Whitford | |
| 5,161,804 A * | 11/1992 | Orlowski et al. | 277/378 |
| 5,730,447 A | 3/1998 | Dawson et al. | |
| 6,220,602 B1 | 4/2001 | Webster et al. | |
| 6,341,781 B1 * | 1/2002 | Matz et al. | 277/391 |
| 6,805,358 B2 | 10/2004 | Dawson et al. | |
| 6,845,986 B2 | 1/2005 | Hood et al. | |
| 6,887,048 B2 | 5/2005 | Hirata et al. | |
| 6,933,643 B1 | 8/2005 | Heine et al. | |
| 7,044,470 B2 | 5/2006 | Zheng | |
| 7,216,871 B1 | 5/2007 | Datta | |
| 7,252,291 B2 * | 8/2007 | Khonsari et al. | 277/360 |
| 2006/0244221 A1 * | 11/2006 | Villeneuve et al. | 277/410 |

FOREIGN PATENT DOCUMENTS

| | | |
|---|---|---|
| EP | 0105616 A | 4/1984 |
| EP | 1344943 A | 9/2003 |
| EP | 1835207 A1 | 9/2007 |

OTHER PUBLICATIONS

European Patent Office, International Search Report and Written Opinion for PCT/IB2008/001780, mailed May 14, 2009.

* cited by examiner

*Primary Examiner* — Alison Pickard
(74) *Attorney, Agent, or Firm* — Dykema Gossett PLLC

(57) ABSTRACT

A non-contacting rotary face seal assembly includes a first sealing member, including a first sealing face and a first magnetic element; and a second sealing member, including a second sealing face and a second magnetic element. The first and second magnetic elements of the first and second sealing members provide a magnetic repulsion force between the first and second magnetic elements such that the magnetic repulsion force separates the first and second sealing faces before hydrodynamic or hydrostatic forces associated with rotation of the second sealing member become sufficient to prevent the first and second sealing faces from contacting.

30 Claims, 6 Drawing Sheets

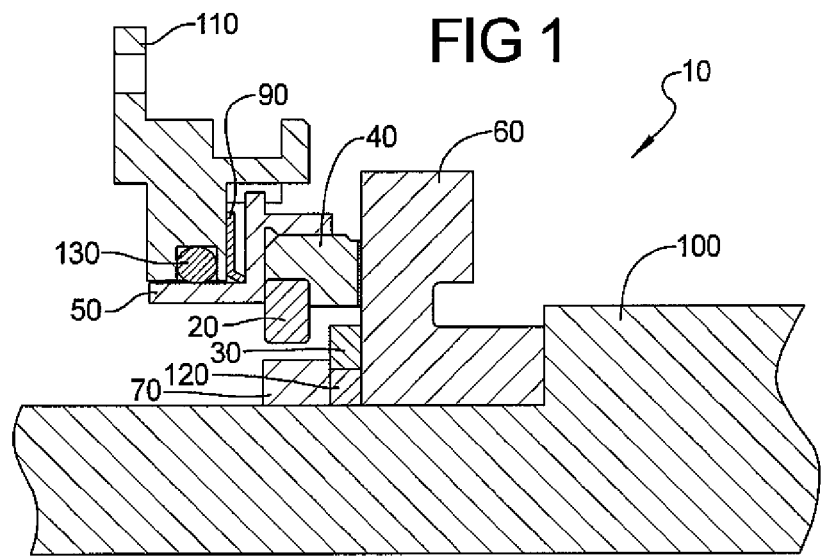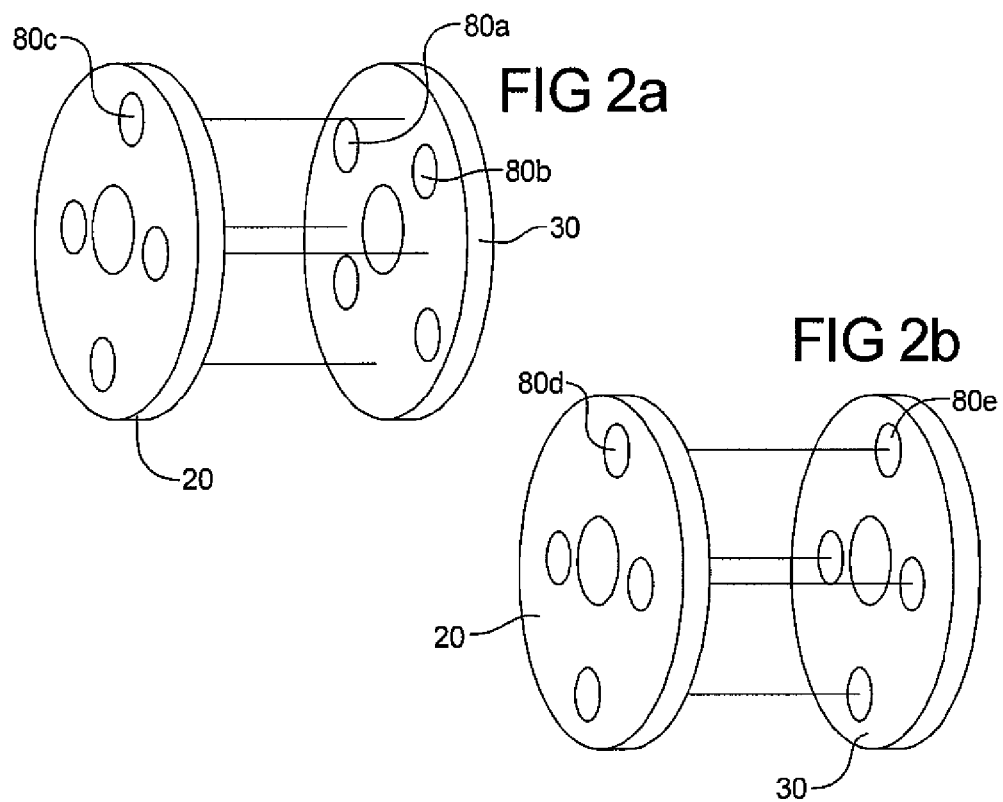

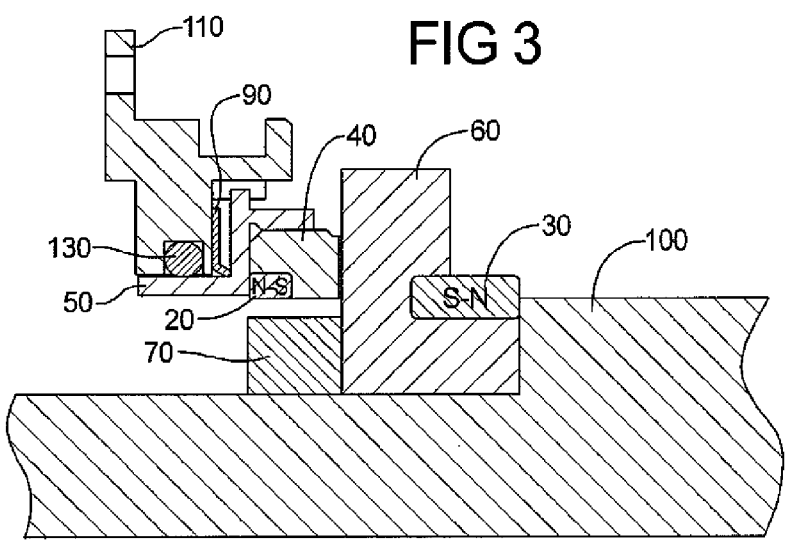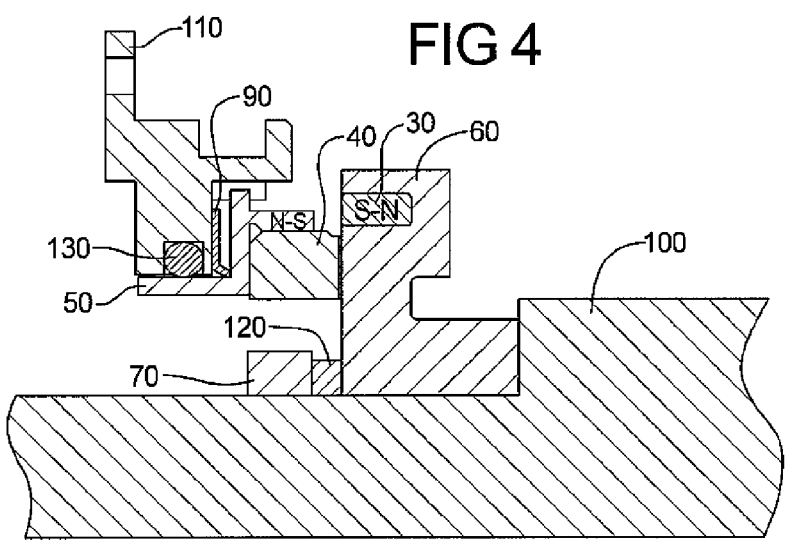

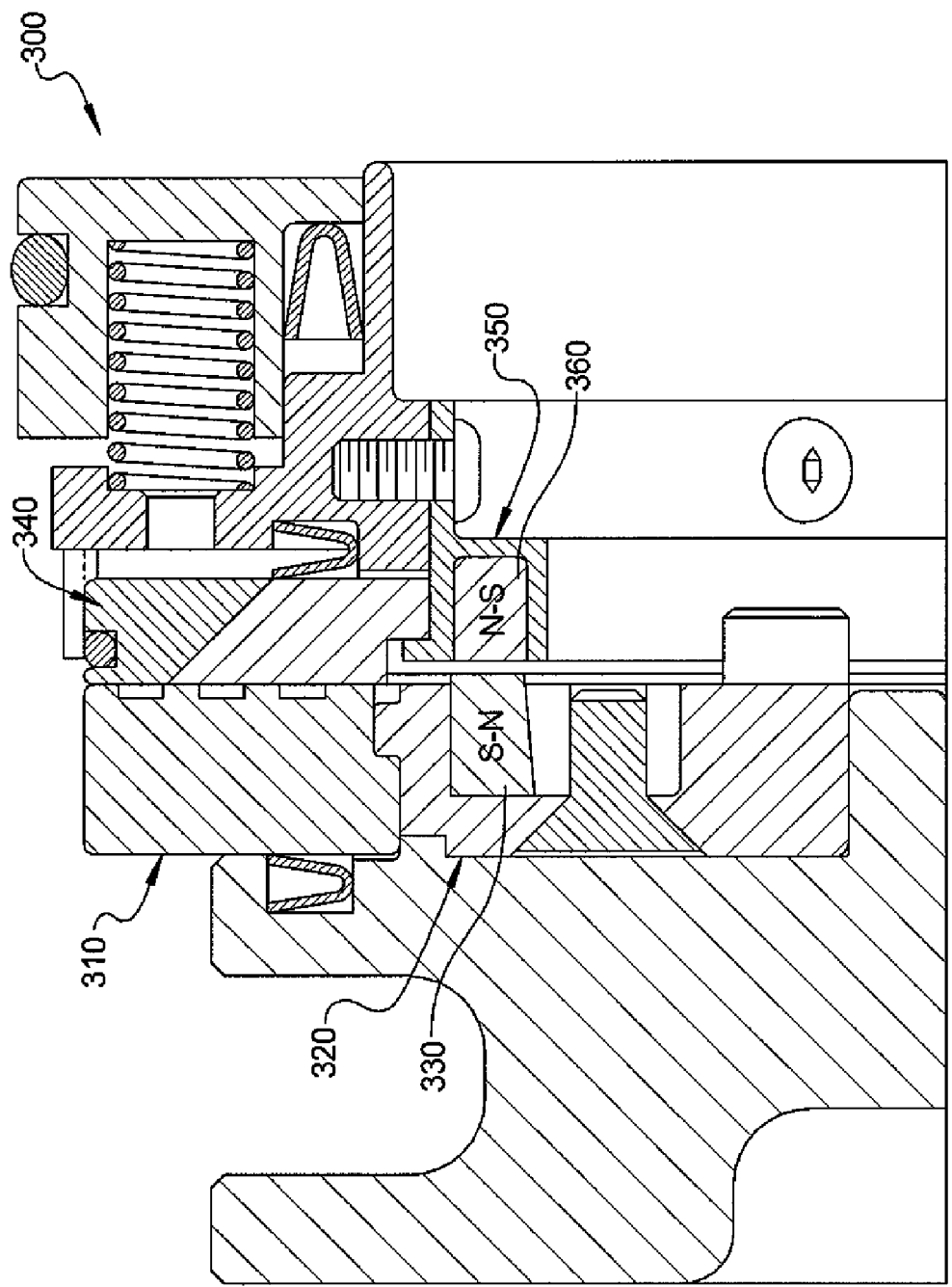

MAGNETICALLY-CONTROLLED ROTARY SEAL

CROSS-REFERENCE TO RELATED APPLICATION

This application claims the benefit of U.S. Provisional Application No. 60/819,407, filed Jul. 10, 2006, which is incorporated herein by reference in its entirety.

TECHNICAL FIELD

The present invention generally relates to gap seals, including non-contacting seals, such as hydrodynamic and/or hydrostatic face and radial seals.

BACKGROUND

For many non-contacting seals, including various hydrodynamic and/or hydrostatic face and radial seals, the associated sealing faces are commonly in contact before operating conditions reach a certain limits. For hydrodynamic non-contacting seals, there is typically a minimum speed needed to create sufficient hydrodynamic force to separate the sealing faces. Below such a threshold speed—which is commonly encountered in connection with start-up or shut-down phases—the seal faces will often contact and/or rub against each other. For hydrostatic non-contacting seals, there is typically a minimum pressure difference that is required to separate the sealing faces. Before that pressure differential is reached, the seal faces are in contact.

There have been devices, such as aspirating seals, that use a spring force to bias the seal faces apart—i.e., to separate—and utilize the pressure differential to close the gap between seal faces. However, such seals commonly may exhibit a lack of film stiffness at critical pressure differential conditions, which can make such seal configurations less stable, particularly at low-pressure transition periods.

SUMMARY

A non-contacting rotary face seal assembly is disclosed that includes a first sealing member, including a first sealing face and a first magnetic element; and a second sealing member, including a second sealing face and a second magnetic element. The first and second magnetic elements of the first and second sealing members provide a magnetic repulsion force between the first and second magnetic elements such that the magnetic repulsion force separates the first and second sealing faces before hydrodynamic or hydrostatic forces associated with rotation of the second sealing member become sufficient to prevent the first and second sealing faces from contacting.

BRIEF DESCRIPTION OF THE DRAWINGS

Embodiments of the invention will now be described, by way of example, with reference to the accompanying drawings, wherein:

FIG. 1 is a cross-sectional view of a gap seal assembly according to an embodiment of the invention;

FIGS. 2a and 2b schematically illustrate a configuration of first and second magnetic elements, shown under different force conductions;

FIG. 3 is a cross-sectional view of another embodiment of a gap seal assembly according to another embodiment of the invention;

FIG. 4 is a cross-sectional view of another embodiment of a gap seal assembly according to another embodiment of the invention;

FIG. 8 is a cross-sectional view of another embodiment of a gap seal assembly according to another embodiment of the invention.

DETAILED DESCRIPTION

Figure 2C:
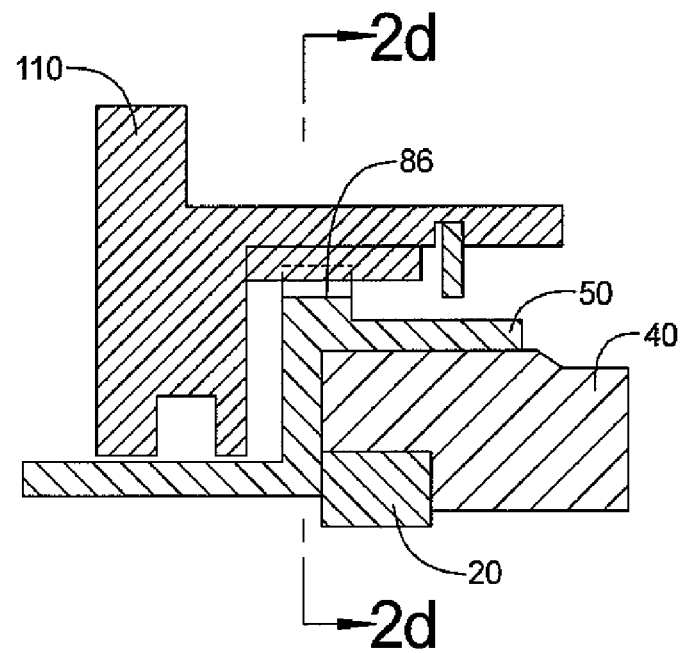
FIG. 2c is a cross-sectional view of a portion of an assembly illustrating an embodiment of an anti-rotational feature.

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

FIG. 1 generally illustrates a cross-sectional view of an embodiment of a gap seal assembly 10 according to an embodiment of the invention. The illustrated assembly 10 is in the form of a rotary face seal, although other forms of assemblies and configurations are contemplated by the invention. Gap seal assembly 10 includes at least two magnetic elements 20,30. First magnetic element 20 (e.g., a magnetic ring) is positioned between an insert or seal ring 40 (e.g., a carbon insert) and a holder 50 (e.g., a metallic holder). Second magnetic element 30 (e.g., a magnetic ring) is attached or otherwise connected to mating ring 60. In an embodiment, second magnetic element is attached or connected to mating ring 60 via a clamping component 70 or other means for attaching or connecting the second magnetic element 30 to mating ring 60 at a desired position. The second magnetic element may, for example, comprise a metal band positioned over a magnetic ring to withstand centrifugal loading or forces.

As shown in the illustrated assembly 10, may include a shaft 100 and housing 110. For some applications, such as that shown, assembly 10 may include a washer 120, which may be positioned between a clamping component 70 and mating ring 60 and may relieve the magnetic ring 30 from an axial clamping force or load. Assembly 10 may also include one or more secondary seals 130.

In an embodiment of the invention, first and second magnetic elements 20,30 are positioned to have opposing polarities (i.e., the same polarities pointing or oriented generally toward each other) to provide a repelling force. The first and second magnetic elements 20,30 include North ("N" or positive) and South ("S" or negative) poles. In the illustrated embodiment, the S-polarities are shown generally pointing or oriented toward each other. For other embodiments, the polarities for both elements may be reversed, such that the N-polarities are instead generally pointing or oriented toward each other.

First and second magnetic elements 20,30, which for some embodiments may take the form of magnetic rings, need not necessarily be continuous circumferentially. Rather, for some embodiments the first and second magnetic elements 20,30 may take the form of non-magnetic material that include pieces of permanent magnets or magnetic material embedded therein—for example, in a generally circumferential pattern that may include intermittencies. With such configurations, the associated face seal may be capable of coming to close or rest at a complete stop.

FIGS. 2a and 2b generally depict first and second magnetic elements 20,30, in the form of rings, with each ring including a plurality of circumferentially-arranged permanent magnets 80 with opposing polarities. With such an embodiment, first magnetic element 20 may be associated with a stator, while second magnetic element 30 may be associated with a rotor. As generally illustrated, with coordinated intermittencies, the repulsion forces associated with the intermittent first and second magnetic elements 20,30 tend to make the respectively associated seal ring 40 and mating ring 60 rest at offset or staggered positions.

FIG. 2a for example, illustrates a relative position in which two magnets (80a and 80b) associated with a second magnetic element (e.g., a rotor) are radially offset or circumferentially staggered with respect to a magnet (80c) associated with first magnetic element 20 (e.g., a stator). In an offset or staggered orientation, the associated repulsion forces will be greatly reduced, and at least one orientation may represent a minimum associated repulsion force. With reference to FIG. 1, a means for overcoming the repulsion force, for example, a closing spring 90, may be employed and may make the associated seal faces contact when a rotor (such as that associated with second magnetic element 30) is stopped.

Once the rotor—for example, that associated with the second magnetic element 30—is running (i.e., rotating), the associated repulsion force will undergo a generally cyclic operational mode with the maximum repulsion forces typically occurring when magnets of opposing elements 20,30 pass each other. An example of a configuration with two magnets 80d and 80e momentarily opposing each other while passing is generally illustrated in FIG. 2b. The average force associated with the assembly can be designed and configured to exceed the force exerted by the means for overcoming the repulsion force, such as the force exerted by a closing spring 90. By configuring such an associated average force associated with the first and second magnetic elements 20,30 to be greater than the force associated with the means for overcoming the repulsion force, the associated seal faces may be kept apart at low speed.

Figure 2D:
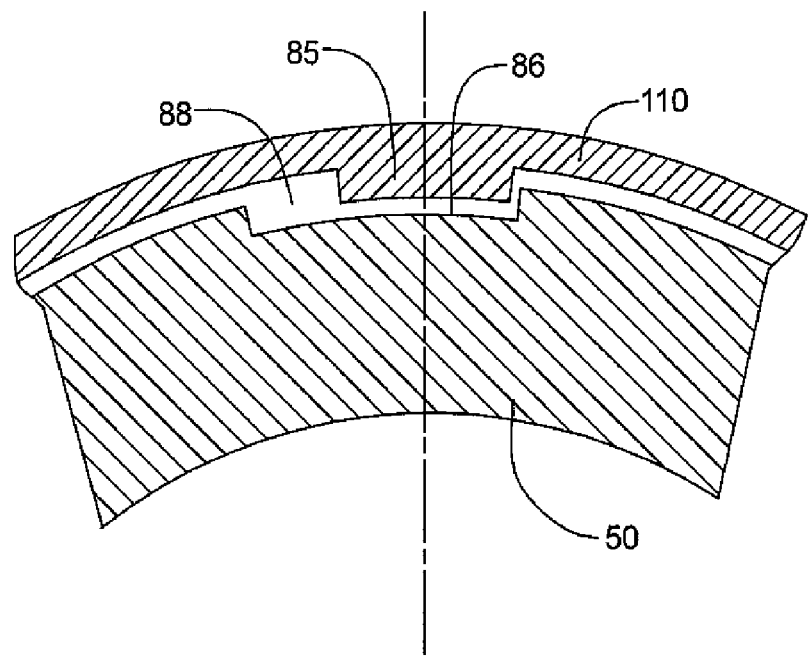
FIG. 2d is a partial sectional view viewed along lines 2d-2d of FIG. 2c.

If closure at a stationary condition is necessary or desirable, the assembly can be configured to permit limited circumferential movement, for instance, by providing extended or widened anti-rotation slots. FIGS. 2c and 2d generally illustrate, by way of non-limiting example, an embodiment of an anti-rotation feature on a seal ring. For example, with an engine, a rotating member (e.g., a mating ring 60) may stop in various orientations. As such, a magnetic element (e.g., ring) 30 attached or connected to the mating ring 60 will also stop in various orientations relative to its counterpart magnetic element 20 (e.g., magnetic ring). Under a closing force, such as a closing spring force, the two opposing magnetic elements 20,30 tend to rest at a minimum repulsion force position (e.g., a staggered orientation, such as generally illustrated in FIG. 2a). However, to achieve such a configuration, the magnetic element 20 needs to be allowed to adjust itself circumferentially. One way to accomplish that is to widen or extend anti-rotation slots on the seal ring. As generally shown in FIGS. 2c and 2d, a seal ring member (e.g., a seal ring holder 50) may include one or more corresponding radial features, such as slots provided on an outer diameter, and the seal ring housing 110 may have one or more corresponding radial features, e.g., protrusions 85. The anti-rotation feature may be used to stop the sealing ring 40 from rotating due to the friction torque from the rotating mating ring 60. With such a configuration, an anti-rotation feature allows the magnetic element (ring) 20 to adjust circumferentially to align itself at a minimum repulsion force position relative to the rotating member, for example as generally shown in FIG. 2a. Moreover, a "widened" anti-rotation slot 86 can provide additional rotational space 88, such as generally illustrated in FIG. 2d. In an embodiment, two or more such anti-rotational features may be provided and used in the assembly.

With configurations of gap seal assemblies 10 such as those previously described, first and second magnetic elements 20,30 can be used to separate seal faces both at start up (at least up to a given pressure) and shut-down. Moreover, the inventive concept may be used for non-contacting seals. By way of example, rather than using a spring device to separate the seal face at free or lower-speed states, one or more sets of magnets can provide opposing polarities to provide repulsion forces between the separate sealing faces. Unlike mechanical springs, which provide relatively constant forces, magnetic repulsion forces grow exponentially as two magnets with opposing polarities get closer to one another. Such sensitivity can be used to precisely control the gap size. As the sealing faces get further apart, the repulsion force will become weaker rapidly, if a relatively constant mechanical closing force, such as a spring force, is used to bias seal members together, the associated seal gap will be relatively constant as well, in spite of tolerance stack up when an associated engine is assembled. Such a design configuration can combine the benefits of both magnetic force and spring force by providing a high degree of stiffness between the two separate components (e.g., sealing ring and mating ring), generally owing to the high stiffness of magnetic repulsion force at a small gap, and a relatively constant gap size between them, generally owing to the relatively constant force provided by a mechanical closing force (e.g., a mechanical spring). Moreover, such an improved stiffness is commonly necessary for engine systems to provide stability and robustness. That is, a constant gap, such as the type disclosed, can provide improved seal performance and a more robust design because the configuration can absorb a tolerance stack-up in an assembly, e.g., an engine assembly, and under dynamic axial movement. Some conventional assemblies employ mechanical springs to bias the sealing faces apart. While the present invention does not, per se, completely preclude their inclusion, there can be downsides to such conventional designs. That is, if the separating force provided by the separating springs is too stiff, it may be too sensitive to tolerance stack-up (or so-called operating length in seal design), and the gap size may be subject to too much variation. Further, if the spring force is relatively constant, then the associated stiffness may be too weak, and the sealing faces may contact under operational forces, such as vibration or inertial forces in the dynamic environment of an engine. By combining a magnetic repulsion force and a mechanical closing force (such as a spring force), embodiments of the invention can integrate benefits of both forces. For instance, an embodiment may provide a seal with excellent or superior stiffness before the engine reaches sufficient speed and pressure to render the hydrodynamic/hydrostatic feature effective to separate the associated sealing faces. Essentially, there would not be a time in normal operation when the seal lacks film stiffness. After a seal operating condition reaches a predetermined pressure condition, operational pressure forces will overcome the magnetic force and push the sealing faces together until a hydrodynamic or hydrostatic thin film is formed to work effectively in a non-contacting state. Moreover, such configurations, may provide for sealing gaps that can be well controlled, and can be configured so that it would, in practice, be very difficult to make the sealing faces contact.

Further, if one magnetic element (e.g., magnetic ring) such as those shown in FIGS. 2a and 2b is provided with a diameter that is larger than the other, the magnetic elements 20,30 will try to center each other when pressed together. As such, the associated magnetic forces between the magnetic elements 20,30 can be used to center the magnetic elements relative to one another. That function can be enhanced if one magnetic element (such as a ring) includes two sets of concentric insert ring comprised of permanent magnets with a certain radial distance and the counterpart magnet ring is sized to be positioned between the two sets of concentric magnets. The associated magnet repulsion forces can actually serve to help center the seal ring because the repulsion force will be at its minimum when the two magnetic elements (e.g., rings) remain concentric.

FIG. 3 generally illustrates a cross-sectional view of a gap seal assembly 10 according to another embodiment of the invention. As generally illustrated, one of the associated magnetic elements (i.e., magnetic element 30) may be positioned on the other side (e.g., back) of mating ring 60. Such a configuration may be desirable, for example, in instances where there is less room potentially available for the seal.

Moreover, instead of using separated magnetic rings, one or more of the seal parts can be made of a magnetic material to effectively serve the same purpose—i.e., serving as a first and/or second magnetic element, and providing a magnetic repulsion force. Without limitation, as generally illustrated in the embodiment of an assembly 10 shown in FIG. 4, holder 50 may be made of a magnetic element, for example, a permanent magnetic material. Moreover, as additionally illustrated, mating ring 60 may be made of a magnetic element. For some applications, a coating that does not hinder necessary function or operability, for example, a tribologic-compatible coating, may be provided on the sealing surface to improve wear resistance.

Figure 5:
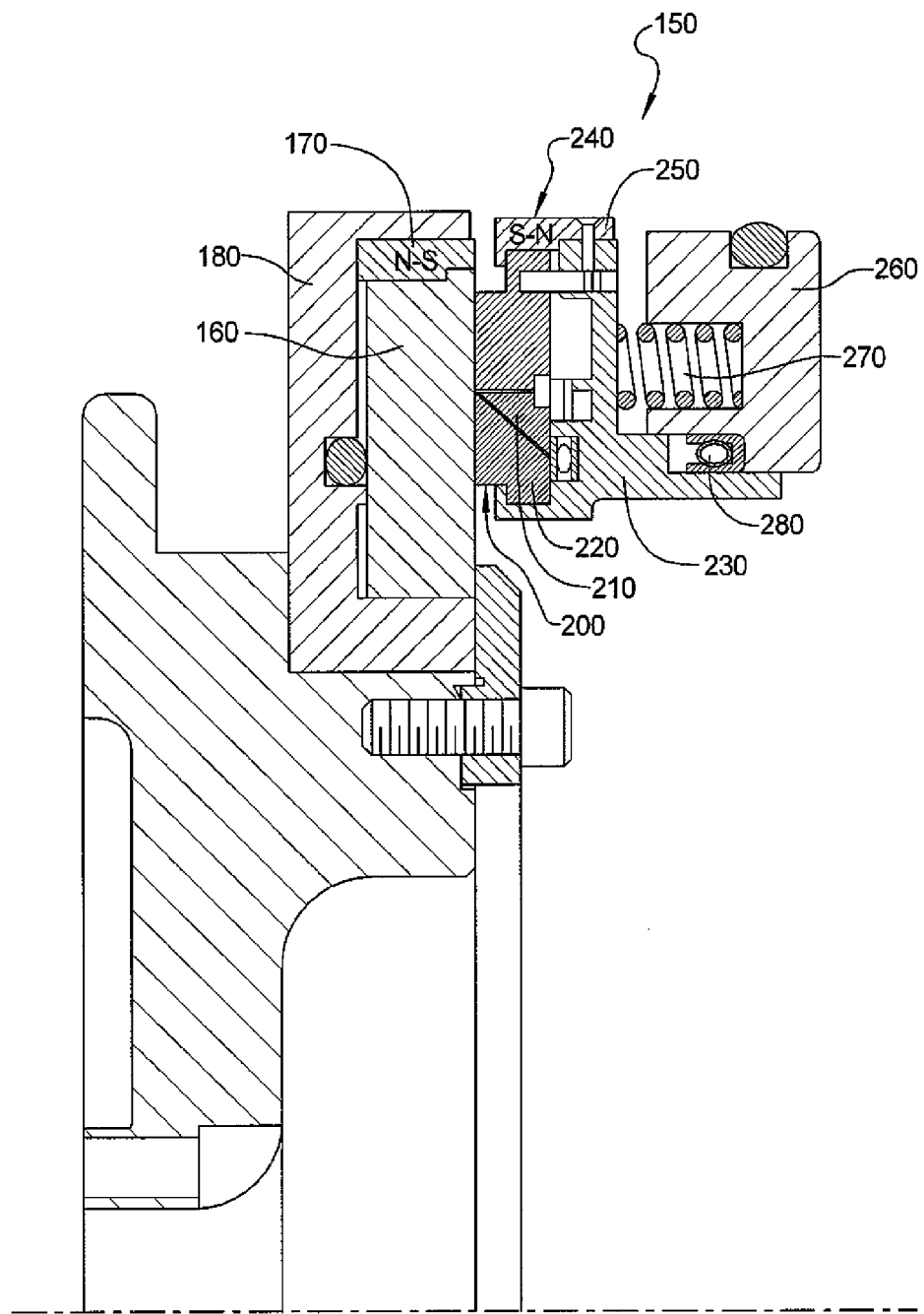
FIG. 5 is a cross-sectional view of another embodiment of a gap seal assembly according to another embodiment of the invention.

For larger diameter seal applications, seal ring may comprise a plurality of segments. The associated magnetic elements may then be integrated into associated seal components. FIG. 5 illustrates an embodiment of a gap seal assembly 150 having a seal ring 200 comprised of segments. As illustrated, mating ring 160 and magnetic ring 170 may be provided substantially within a holder 180. Mating ring 160 may be mounted in such a manner that it is generally free of pressure deflection and is also generally relieved from clamping deflection. Seal ring 200 may be comprised of a plurality of segments (e.g., first segment 210 and second segment 220) contained or secured in part by or within a seal holder 230. In the illustrated embodiment, a top cap 240 is shown including a magnetic ring 250 with an opposing polarity to that of magnetic ring 170 of a rotor. As generally illustrated, a housing 260 may be provided that includes a spring member, such as spring 270. One or more secondary seals, such as element 280, may also be provided.

When there is little or no pressure, the associated magnetic forces will essentially balance the spring force, providing the sealing faces in a non-contacting configuration. When the pressure effectively increases to a given or predetermined value, a pressure drop over the restrictive orifices will push the seal ring 200 against the mating ring 160. In an engine, pressure is typically associated with speed. As the pressure effectively reaches a given or predetermined value, the rotor speed will become sufficient for the hydrodynamic features on the mating ring 160 to be effective, and will generally form a thin air film between the sealing faces—i.e., between the mating ring 160 and sealing ring 200.

As previously described, if the associated magnetic elements (e.g., rings) are comprised of an array of permanent magnets, the associated seal can be configured to close at a stationary state since the magnetic elements (e.g., rings) tend to align in a staggered position, for example, as generally shown in FIG. 2a. The associated magnetic force then essentially will only become effective if there is a rotation because the magnets will tend to pass each other when lined up and create large opening force, for example, as generally shown in FIG. 2b. With such embodiments, the seal that is provided by the assembly may be close during a start, separate at low speed based on magnetic forces, and then stay close (yet still non-contacting) when an associated hydrodynamic force is generated.

A similar concept can be employed with a segmented radial seal. For instance, individual magnets and magnetic rings may be embedded in or attached to seal segments and a runner. By arranging magnets in opposing polarity directions, the sealing faces can be separated at a small gap at low speed and/or under low pressure by magnetic repulsion force. By providing an additional magnetic ring or by using magnetic material (such as a ferrous housing or seal shoulder), closing springs may be reduced or eliminated by employing magnetic attraction and repulsion forces.

Figure 6:
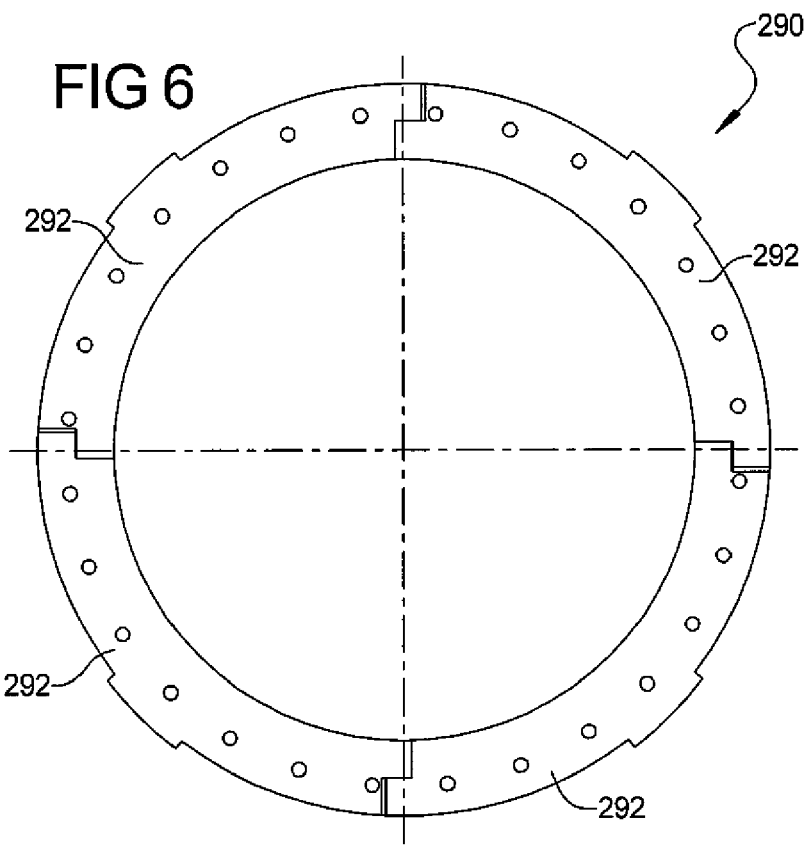
FIG. 6 is top plan view of a segmented joint according to an embodiment of the invention.
Figure 7:
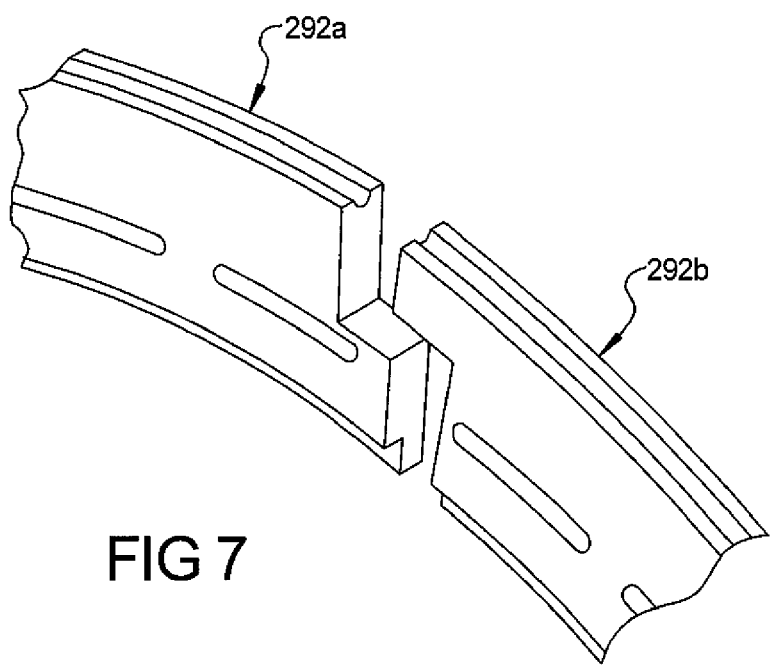
FIG. 7 is a partial perspective view of the interface between segment ends.

For some applications, segmenting the seal ring/insert can provide improved compliance of the insert segment to track a rotor face. Moreover, each segment may be allowed to articulate independently of its adjoining segments without imposing additional hoop stress. Segmentation may additionally permit the scaling of seal designs to larger diameters, which can allow for improved manufacturability of the seal. FIG. 6 illustrates a top plan view of a segmented joint 290 according to an embodiment of the invention. However, the illustrated embodiment is exemplary only, and those of skill in the art will recognize that various other configurations, including those having a different number of segments 292, are contemplated by the invention. As generally shown in FIG. 7, the ends of adjacent segments 292a,292b may be designed to interconnect. The ends may be configured to mirror one another to allow connection and, for some embodiments, may be tapered.

FIG. 8 generally illustrates a cross-sectional view of an embodiment of a gap seal assembly 300 according to another embodiment of the invention. The illustrated assembly 300 includes a rotor 310; a rotor magnet assembly 320, including a magnetic element 330; a segmented stator assembly 340; and a stator magnet assembly 350, including a magnetic element 360. The actual mating ring or rotor 310 may, for example, be comprised of stainless steel (such as 440C stainless steel) to provide a sufficiently hardened tribological surface in the event of contact with the stator. As generally illustrated in the embodiment shown in FIG. 8, rotor 310 may be retained on a shaft adapter (e.g., a titanium shaft adapter) via a rotor magnet assembly 320—which may also provide an anti-rotation feature between the shaft adapter and rotor.

As noted, the illustrated embodiment of assembly 300 may include a multi-segmented rotor magnet assembly 320. The rotor magnet assembly 320 may, for example, be comprised of a solid ring titanium housing, individual tapered magnetic segments that generally form a ring, a solid ring tapered collar, and several connection devices (e.g., screws). In an embodiment, the associated individual magnets may be fitted into the housing while a tapered collar, which may be drawn into the housing via screws, can be used to compress the magnets within the housing. Such compression, or pre-stressing, allows the magnet segments to maintain compression within the housing while rotating at speeds up to approximately 15,000 rpm or more.

As with prior embodiments, the magnetic elements associated with the rotor magnetic assembly 320 provide a repulsive force with respect to the magnetic elements associated with the stator magnet assembly 350. The magnetic repulsion force permits the respective assemblies to maintain a "normally open" condition during shutdown and start-up operations, while allowing the mating seal surfaces to remain in close proximity to one another. By way of example, without limitation, the surfaces may remain within approximately 0.040 inches of one another, or less. The magnetic repulsion force may be balanced by one or more resilient members (e.g., compression coil springs) and the break-away friction of a secondary seal, which may both be located in a stator housing assembly, can be configured so that a minimum gap exists between the rotor and stator assemblies during shutdown and prior to achieving a film-riding lift-off speed. The associated magnetic repulsion force may be overcome once system pressure is achieved and may be tuned for different applications and/or desired clearances. For some embodiments, a spring-energized secondary seal may also be provided in the back portion of the rotor to help balance pressure forces between the back of the seal and the associated seal face.

Again, operatively, embodiments of the invention permit the use of permanent magnets to separate sealing faces for a hydrodynamic seal at little or no speed during machine start-up and shut-down. At those phases, the pressure and spring force will close the faces when the system pressure reaches a certain value. Because system pressure is generally associated with speed, at higher pressure, the rotational speed will be sufficient to render the hydrodynamic features on the sealing faces effective. Hydrodynamic opening force may therefore be generated to separate the sealing faces at a distance of less than a few thousandths of inches. Thus, the sealing faces may never touch, but may seal very well for high pressures. As such, for many embodiments, the sealing faces will never contact.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A non-contacting rotary seal assembly, comprising:
a first sealing member, including a first sealing face and a first fixed magnetic element comprising a magnetic ring;
a second sealing member, including a second sealing face and a second fixed magnetic element comprising a magnetic ring; the first fixed magnetic element is fixed to the first sealing member, the second fixed magnetic element is fixed to the second sealing member, and the first and second magnetic elements of the first and second sealing members provide a magnetic repulsion force between the first and second fixed magnetic elements; and
wherein the magnetic ring of the first sealing member and the magnetic ring of the second sealing member have different diameters, the second sealing member includes a hydrodynamic feature configured to generate a hydrodynamic opening force, magnetic repulsion force separates the first and second sealing faces before the hydrodynamic opening force associated with rotation of the second sealing member become sufficient to prevent the first and second sealing faces from contacting, and the hydrodynamic opening force generated will separate the first and second sealing faces at a distance of less than a few thousandths of an inch.

2. The assembly of claim 1, wherein the seal assembly comprises a rotary face or a radial seal.

3. The assembly of claim 1, including a biasing mechanism that provides a biasing force that urges at least a portion of the first sealing member toward at least a portion of the second sealing member.

4. The assembly of claim 3, wherein the biasing mechanism includes a resilient mechanical device.

5. The assembly of claim 4, wherein the resilient mechanical device includes a spring.

6. The assembly of claim 3, wherein the biasing mechanism utilizes a magnetic attraction force.

7. The assembly of claim 1, wherein operational pressure forces associated with the rotation of the second sealing member eventually overcome the magnetic repulsion force and move the first and second sealing faces closer together until a hydrodynamic or hydrostatic film is formed between the sealing faces.

8. The assembly of claim 1, wherein the first sealing face is configured to rotate and the second sealing face is configured to be non-rotating.

9. The assembly of claim 1, wherein a portion of the first sealing face, a portion of the second sealing face, or portions of both the first and second sealing faces include a coating.

10. The assembly of claim 9, wherein the coating comprises a tribologic-compatible coating.

11. The assembly of claim 1, wherein the first sealing member comprises a rotor and the second sealing member comprises a stator.

12. The assembly of claim 1, wherein the first fixed magnetic element or the second fixed magnetic element comprise a plurality of permanent magnets.

13. The assembly of claim 12, wherein both the first and second fixed magnetic elements comprise a plurality of permanent magnets.

14. The assembly of claim 12, wherein the plurality of permanent magnets are generally arranged in a ring-like configuration.

15. The assembly of claim 14, wherein the plurality of magnets are not arranged to be continuous circumferentially.

16. The assembly of claim 1, wherein the first and second fixed magnetic rings are configured so that the magnetic force centers a portion of one magnetic ring with respect to a portion of the other magnetic ring.

17. The assembly of claim 1, wherein the second sealing member includes an anti-rotation feature.

18. A non-contacting rotary seal assembly, comprising:
a first fixed magnetic element attached or connected to a seal ring, the first fixed magnetic element comprising a magnetic ring; and
a second fixed magnetic element attached or connected to a mating ring, the second fixed magnetic element comprising a magnetic ring;

wherein the first fixed magnetic element is fixed to the seal ring, the second fixed magnetic element is fixed to the mating ring, the magnetic rings of the first and second fixed magnetic elements having different diameters; and further wherein the first fixed magnetic element and the second fixed magnetic elements provide a magnetic repulsion force between the first and second fixed magnetic elements, the seal ring or the mating ring include a hydrodynamic feature configured to generate a hydrodynamic opening force, the magnetic repulsion force separates the seal ring and the mating ring before the hydrodynamic opening force associated with rotation of either the seal ring or the mating ring become sufficient to prevent the seal ring and the mating ring from contacting, and the hydrodynamic opening force generated will separate the seal ring and the mating ring at a distance of less than a few thousandths of an inch.

19. The assembly of claim 18, wherein the first fixed magnetic element is part of a stator, and the second fixed magnetic element is part of a rotor.

20. The assembly of claim 18, including a means for urging at least a portion of the first fixed magnetic element toward at least a portion of the second fixed magnetic element.

21. The assembly of claim 20, wherein the means for urging includes a resilient mechanical device.

22. The assembly of claim 21, wherein the mechanical device includes a spring.

23. The assembly of claim 21, wherein the means for urging utilizes a magnetic attraction force.

24. The assembly of claim 18, wherein the first magnetic element is formed integrally with the seal ring.

25. The assembly of claim 18, wherein the second magnetic element is formed integrally with the mating ring.

26. The assembly of claim 18, wherein the seal ring is segmented.

27. The assembly of claim 18, wherein pressure forces associated with the rotation of the seal ring or the mating ring eventually overcome the magnetic repulsion force and move the first and second fixed magnetic elements closer together until a hydrodynamic film is formed between the seal ring and mating ring.

28. A method for making a non-contacting rotary seal assembly, comprising:
　providing a first sealing member including a first sealing face;
　providing a first fixed magnetic element in connection with the first sealing face, the first fixed magnetic element comprising a magnetic ring and fixed to the first sealing member;
　providing a second sealing member including a second sealing face and a hydrodynamic feature configured to generate a hydrodynamic opening force;
　providing a second fixed magnetic element in connection with the second sealing face, the second fixed magnetic element comprising a magnetic ring and fixed to the second sealing member, the magnetic rings of the first and second fixed magnetic elements having different diameters; and
　providing a mechanical closing force to bias the first and second sealing faces together;
　wherein a magnetic repulsion force between the first and second fixed magnetic elements is configured to separate the first and second sealing faces before the hydrodynamic opening force associated with rotation of the second sealing member become sufficient to prevent the first and second sealing faces from contacting, and the hydrodynamic opening force generated will separate the first and second sealing faces at a distance of less than a few thousandths of an inch.

29. The method of claim 28, wherein the first magnetic element is integrally formed with the first sealing member or the second magnetic element is integrally formed with the second sealing member.

30. The method of claim 28, wherein a gap provided between the sealing faces is generally controlled by sizing the associated magnetic elements or changing or adjusting the mechanical biasing force.

* * * * *